US010976441B2

(12) United States Patent
Ashjaee (10) Patent No.: US 10,976,441 B2
(45) Date of Patent: Apr. 13, 2021

(54) METHOD OF USING GNSS SYSTEM HAVING MAGNETIC LOCATOR

(71) Applicant: JAVAD GNSS, Inc., San Jose, CA (US)

(72) Inventor: Javad Ashjaee, Saratoga, CA (US)

(73) Assignee: JAVAD GNSS, Inc., San Jose, CA (US)

( * ) Notice: Subject to any disclaimer, the term of this patent is extended or adjusted under 35 U.S.C. 154(b) by 264 days.

(21) Appl. No.: 15/607,307

(22) Filed: May 26, 2017

(65) Prior Publication Data
US 2017/0343678 A1    Nov. 30, 2017

Related U.S. Application Data

(60) Provisional application No. 62/342,819, filed on May 27, 2016.

(51) Int. Cl.
*G01S 19/26* (2010.01)
*G01C 15/06* (2006.01)
*G01S 19/45* (2010.01)
*G01S 19/23* (2010.01)
*G01S 19/28* (2010.01)
*H04L 29/08* (2006.01)

(52) U.S. Cl.
CPC .............. *G01S 19/26* (2013.01); *G01C 15/06* (2013.01); *G01S 19/23* (2013.01); *G01S 19/28* (2013.01); *G01S 19/45* (2013.01); *H04L 67/18* (2013.01)

(58) Field of Classification Search
None
See application file for complete search history.

(56) References Cited

U.S. PATENT DOCUMENTS

| 8,022,868 | B2 | 9/2011 | Yudanov et al. |
| 8,094,087 | B2 | 1/2012 | Ashjaee et al. |
| 8,120,527 | B2 | 2/2012 | Ashjaee et al. |
| 8,125,376 | B1 | 2/2012 | Ashjaee et al. |

(Continued)

FOREIGN PATENT DOCUMENTS

| EP | 2040029 A1 | 3/2009 |
| WO | 1996013700 A1 | 5/1996 |

OTHER PUBLICATIONS

International Search Report and Written Opinion Received for PCT Patent Application No. PCT/US2017/034846, dated Aug. 4, 2017, 14 pages.

(Continued)

*Primary Examiner* — Whitney Moore
(74) *Attorney, Agent, or Firm* — Kilpatrick Townsend & Stockton LLP (57) ABSTRACT

Embodiments of the present disclosure relate to a magnetic locator for a GNSS device. The magnetic locator includes a magnetic field sensor configured to detect a magnetic field adjacent the magnetic locator; a controller coupled to the magnetic field sensor and configured to receive from the magnetic field sensor measurement data based on the magnetic field and calculate sensor data based on the received measurement data; a communication interface coupled to the controller and adaptable to transmit sensor data received from the controller to the GNSS device; a connector adaptable to connect the magnetic locator to a GNSS antenna of the GNSS device; and a housing.

8 Claims, 11 Drawing Sheets

(56) References Cited

U.S. PATENT DOCUMENTS

| | | | |
|---|---|---|---|
| 8,169,379 B2 | 5/2012 | Zhukov et al. | |
| 8,224,525 B1 | 7/2012 | Rapoport et al. | |
| 8,606,498 B2 | 12/2013 | Pesterev et al. | |
| 8,629,988 B2 | 1/2014 | Gribkov | |
| 8,717,232 B2 | 5/2014 | Ashjaee et al. | |
| 8,717,233 B2 | 5/2014 | Ashjaee et al. | |
| 8,769,838 B2 * | 7/2014 | Ward | G01C 15/06 33/293 |
| 8,872,700 B2 | 10/2014 | Ashjaee et al. | |
| 8,975,967 B2 | 3/2015 | Ashjaee et al. | |
| 9,103,912 B2 | 8/2015 | Yudanov et al. | |
| 9,168,946 B2 | 10/2015 | Ashjaee et al. | |
| 9,228,835 B2 | 1/2016 | Gribkov et al. | |
| 9,250,328 B2 | 2/2016 | Ashjaee et al. | |
| 9,671,497 B2 | 6/2017 | Ashjaee et al. | |
| 9,696,447 B1 * | 7/2017 | Olsson | G01S 13/88 |
| 9,720,093 B2 | 8/2017 | Ashjaee | |
| 9,748,926 B2 | 8/2017 | Ashjaee et al. | |
| 2009/0024325 A1 * | 1/2009 | Scherzinger | G01C 15/06 702/5 |
| 2010/0315286 A1 * | 12/2010 | Cerniar | G01C 15/002 342/357.25 |
| 2012/0186090 A1 | 7/2012 | Ward | |
| 2012/0229333 A1 | 9/2012 | Ashjaee et al. | |
| 2012/0299936 A1 | 11/2012 | Ashjaee et al. | |
| 2013/0016006 A1 | 1/2013 | Ashjaee et al. | |
| 2014/0062778 A1 | 3/2014 | Ashjaee et al. | |
| 2015/0100269 A1 | 4/2015 | Ashjaee | |
| 2015/0116145 A1 | 4/2015 | Ashjaee | |
| 2015/0234055 A1 | 8/2015 | Ashjaee et al. | |
| 2016/0018530 A1 | 1/2016 | Ashjaee | |
| 2016/0041268 A1 | 2/2016 | Ashjaee | |
| 2016/0178368 A1 | 6/2016 | Ashjaee | |
| 2016/0178369 A1 | 6/2016 | Ashjaee | |
| 2016/0178754 A1 | 6/2016 | Ashjaee | |
| 2017/0102467 A1 * | 4/2017 | Nielsen | G01S 19/14 |
| 2017/0176600 A1 * | 6/2017 | Vollath | G01S 19/43 |
| 2017/0219715 A1 | 8/2017 | Ashjaee | |
| 2017/0293032 A1 | 10/2017 | Ashjaee | |
| 2018/0045834 A1 | 2/2018 | Ashjaee | |
| 2018/0062677 A1 | 3/2018 | Ashjaee | |
| 2020/0166338 A1 * | 5/2020 | Pares Calaf | G01S 19/51 |

OTHER PUBLICATIONS

Martin et al., "Compact Integration of a GSM-19 Magnetic Sensor with High-Precision Positioning using VRS GNSS Technology", Sensor, vol. 9, 2009, pp. 2944-2950.

\* cited by examiner

METHOD OF USING GNSS SYSTEM HAVING MAGNETIC LOCATOR

CROSS-REFERENCE TO RELATED APPLICATION

This application claims priority to U.S. Provisional Application Ser. No. 62/342,819, filed May 27, 2016, which is hereby incorporated by reference in its entirety.

BACKGROUND

1. Field

The present invention relates to detection of magnetic fields, and in particular, detection of magnetic fields for use by Global Navigation Satellite System (GNSS) devices.

2. Related Art

Navigation receivers that use global navigation satellite systems, such as GPS or GLONASS (hereinafter collectively referred to as "GNSS"), enable a highly accurate determination of the position of the receiver. The satellite signals may comprise carrier harmonic signals that are modulated by pseudo-random binary codes and that, on the receiver side, may be used to measure the delay relative to a local reference clock. These delay measurements are used to determine the pseudo-ranges between the receiver and the satellites. The pseudo-ranges are not true geometric ranges because the receiver's local clock is different from the satellite onboard clocks. If the number of satellites in sight is greater than or equal to four, then the measured pseudo-ranges can be processed to determine the user's single point location as represented by a vector $X=(x, y, z)^T$, as well as to compensate for the receiver clock offset.

GNSS devices are used in a lot of circumstances, including land surveying. In some cases, a GNSS device is used to determine the precise coordinates of points of interest, such as corners or boundaries of a plot of land, pipes or cables buried in the ground, markers or tags in the ground. Typically, a GNSS device is visually aligned to a point of interest before determining a set of coordinates.

BRIEF DESCRIPTION OF THE DRAWINGS

FIG. 14 illustrates a logic diagram showing a computing system that can be used to implement embodiments of the present technology; and In the following description, reference is made to the accompanying drawings which form a part thereof, and which illustrate several embodiments of the present invention. It is understood that other embodiments may be utilized and structural and operational changes may be made without departing from the scope of the present invention. The use of the same reference symbols in different drawings indicates similar or identical items.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the invention as claimed. Thus the various embodiments are not intended to be limited to the examples described herein and shown, but are to be accorded the scope consistent with the claims.

Some embodiments of a magnetic locator of the present technology replace the tip on the bottom of a survey pole. The magnetic locator has magnetic sensors that detect magnetic fields and transmit magnetic field data to an associated GNSS device. The GNSS device can associate the magnetic field data with a location where the data was obtained and display information based on the magnetic field data, including plots of the magnetic field and identification and location of metallic objects. Using some embodiments of the magnetic locator of the present technology enables faster surveys by identifying survey markers and other metallic objects of interest without requiring a surveyor to first uncover these objects. Additionally, by associating a location of a point-of-interest with a magnetic field value for the point-of-interest, the location can later be verified to be taken at, for example, a metallic marker. In addition to a magnetic locator, other types of earth sensors may also be used.

Figure 1:
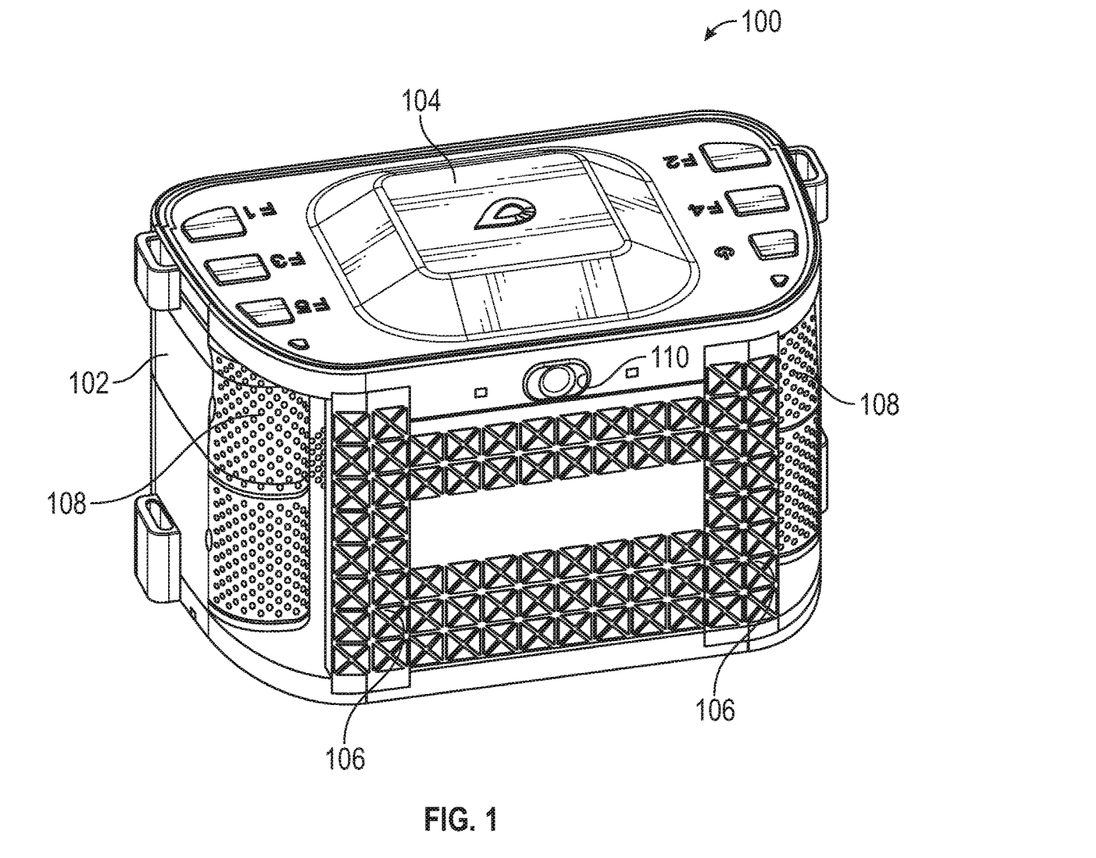
FIG. 1 illustrates a perspective view of a handheld GNSS device according to embodiments of the invention.
Figure 4:
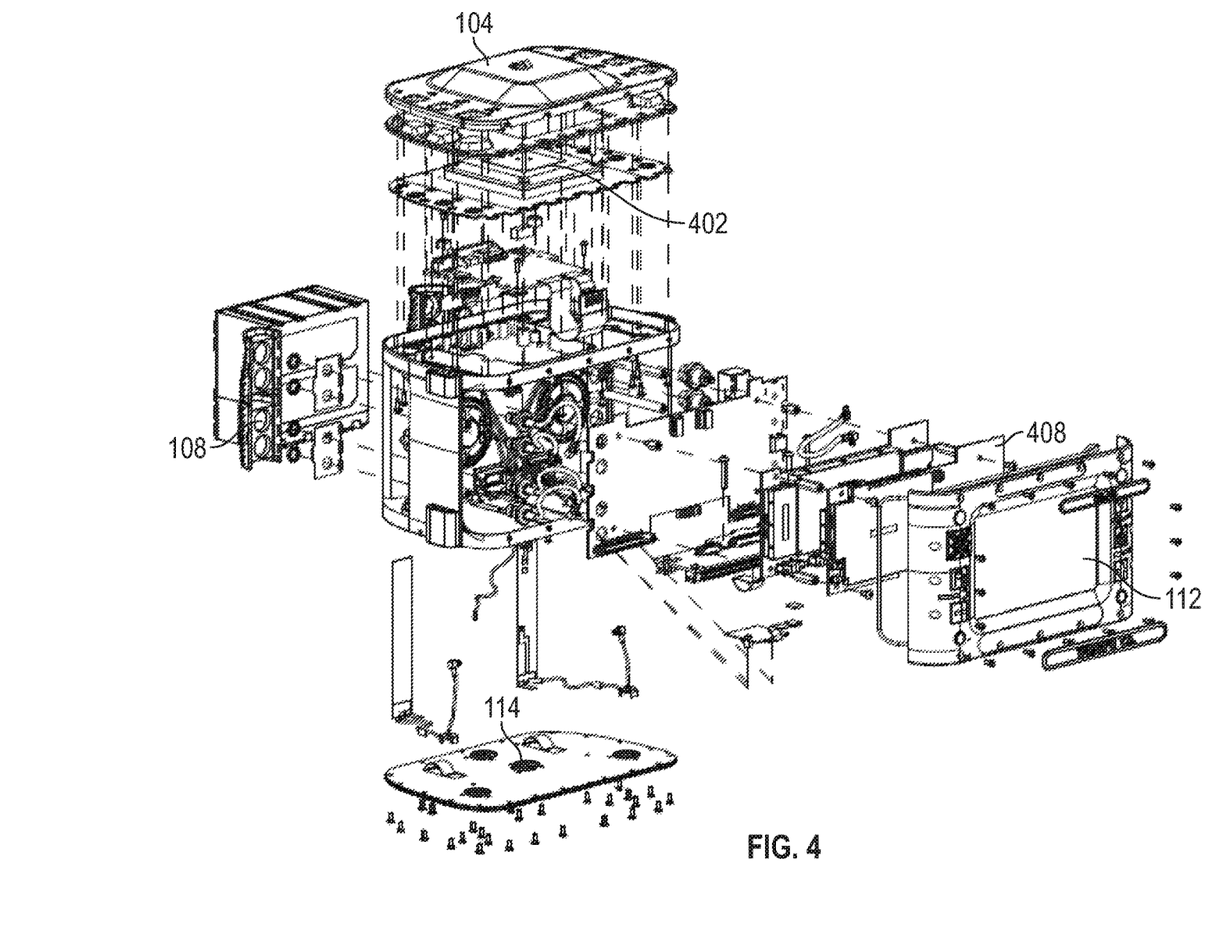
FIG. 4 illustrates an exploded view of a handheld GNSS device including a viewfinder for a camera according to embodiments of the invention.

FIG. 1 illustrates an exemplary handheld GNSS device 100. Handheld GNSS device 100 utilizes a single housing 102. Several GNSS elements are integral to the housing 102 in that they are within the housing or securely mounted thereto. A securely mounted element may be removable. Housing 102 allows the user to hold the handheld GNSS device 100 similar to the way one would hold a typical camera. In one example, the housing 102 may include GNSS antenna cover 104 to cover a GNSS antenna 402 (shown in exemplary exploded view in FIG. 4) which may receive signals transmitted by a plurality of GNSS satellites and used by handheld GNSS device 100 to determine position. The GNSS antenna 402 is integral with the housing 102 in that it resides in the housing 102 under the GNSS antenna cover 104.

In one example, GNSS antenna 402 may receive signals transmitted by at least four GNSS satellites. In the example shown by FIG. 1, GNSS antenna cover 104 is located on the top side of handheld GNSS device 100.

Handheld GNSS device 100 may further include at least one handgrip 108. In the example shown in FIG. 1, two handgrips 108 are integral to the housing 102. The handgrips 108 may be covered with a rubber material for comfort and to reduce slippage of a user's hands.

A front camera lens 110 is located on the front side of the handheld GNSS device 100. An image sensor (not shown) is mounted within handheld GNSS device 100 allowing the image sensor to work with front camera lens 110 to produce image data of scenes in front of handheld GNSS device 100. A second bottom camera lens 116 may be located on the bottom side of the handheld GNSS device 100 in the example shown in FIG. 3. The camera included may be a still or video camera.

Figure 2:
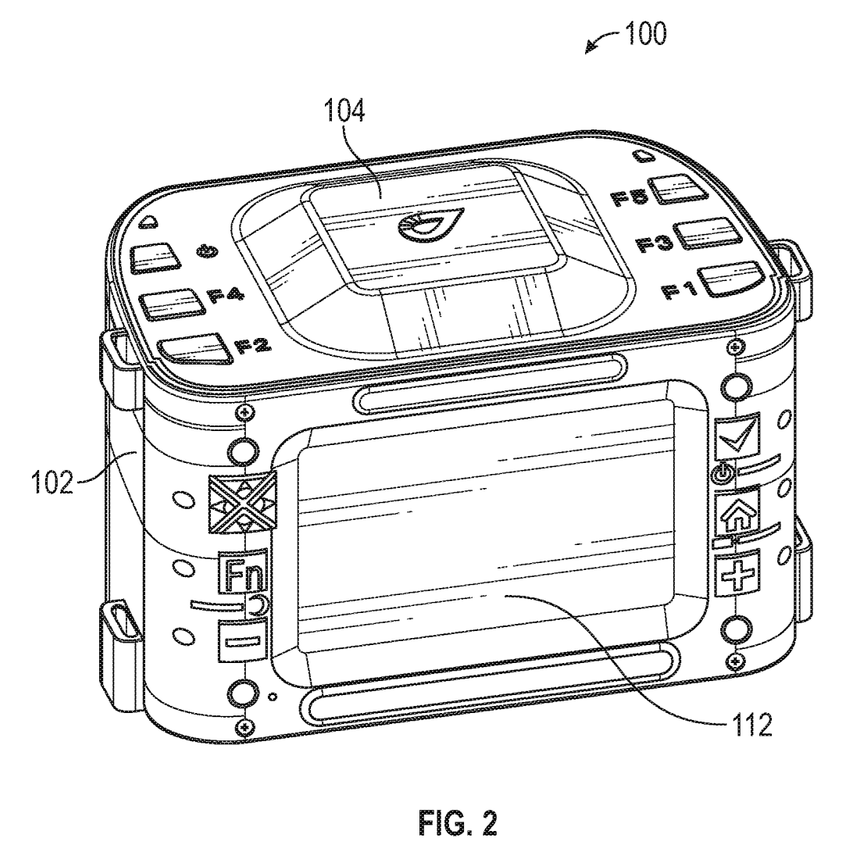
FIG. 2 illustrates another perspective view of a handheld GNSS device according to embodiments of the invention.

As shown in FIG. 2, handheld GNSS device 100 may further include display 112 for displaying information to assist the user in positioning the device. Display 112 may be any electronic display such as a liquid crystal display (LCD), light-emitting diode (LED) display, and the like. Such display devices are well known by those of ordinary skill in the art and any such device may be used. In the example shown by FIG. 2, display 112 is integral with the back side of the housing 102 of handheld GNSS device 100.

Handheld GNSS device 100 may further include a camera for recording still images or video. Such recording devices are well known by those of ordinary skill in the art and any such device may be used. In the example illustrated in FIG. 1, front camera lens 110 is located on the front side of handheld GNSS device 100. In one example, display 112 may be used to display the output of front camera lens 110.

Figure 3:
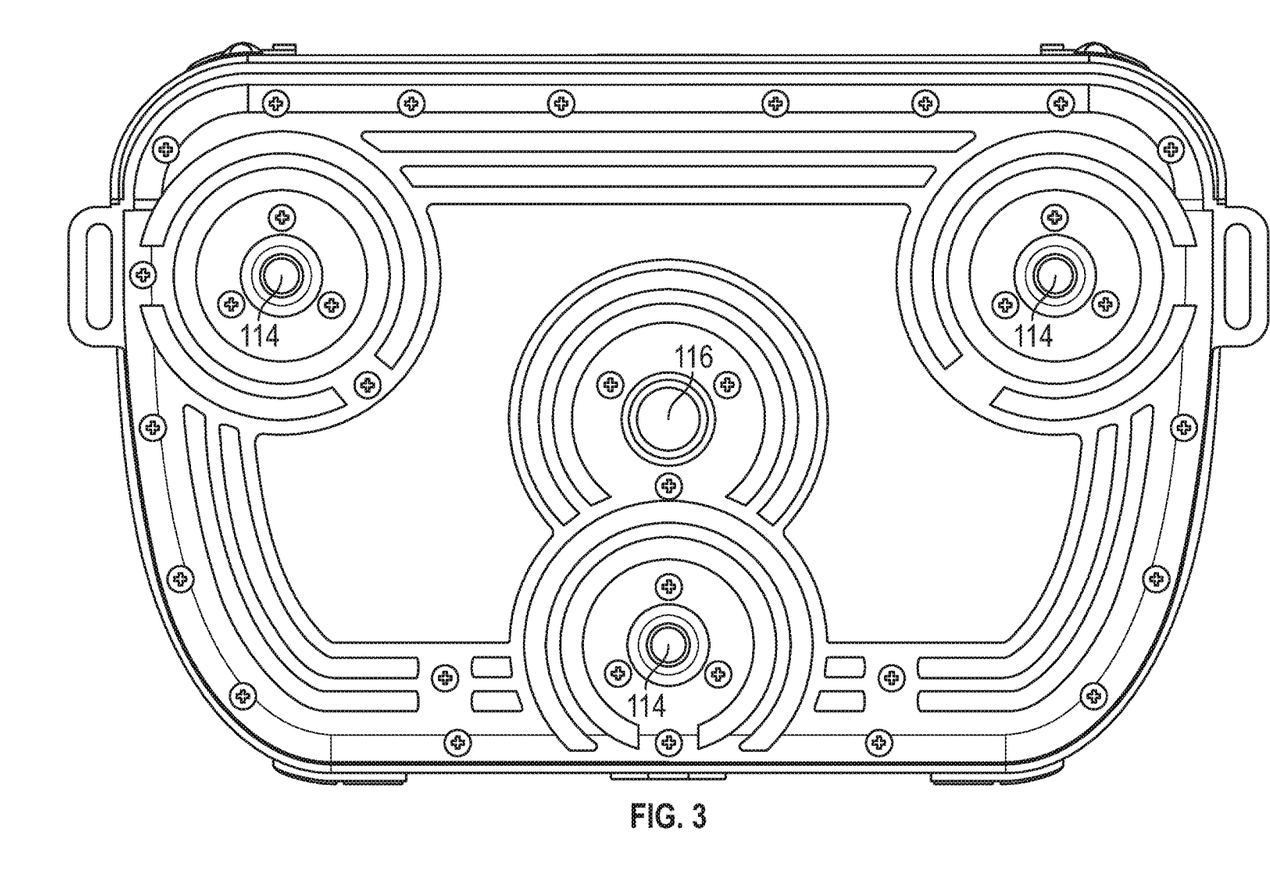
FIG. 3 illustrates another perspective view of a handheld GNSS device according to embodiments of the invention.

With reference to FIG. 3, handheld GNSS device 100 may also include a second bottom camera lens 116 on the bottom of handheld GNSS device 100 for viewing and alignment of the handheld GNSS device 100 with a point-of-interest marker. Second bottom camera lens 116 may also have an associated second camera. FIG. 3 illustrates a bottom view of the handheld GNSS device 100 according to embodiments of the invention. The handheld GNSS device 100 may be mounted on a tripod, or some other support structure, by a mounting structure such as three threaded bushes 114, in some embodiments of the invention. The image of the point-of-interest marker may also be recorded along with the GNSS data to ensure that the handheld GNSS device 100 was mounted correctly, or to compensate for misalignment later based on the recorded camera information. A description of the bottom camera lens 116 and its use to compensate for misalignment may be found in U.S. Pat. No. 9,250,328, filed Sep. 30, 2009, assigned to the assignee of the present invention and incorporated herein by reference in its entirety for all purposes.

The handheld GNSS device 100 may be mounted on a mounting device, such as a survey pole (e.g., a monopod, a tripod, or trolley), or some other support structure, by a mounting structure such as three threaded bushes 114. While it may be located centrally on the bottom of handheld GNSS device 100, second bottom camera lens 116 also be offset to allow for handheld GNSS device 100 to be mounted on a survey pole or other support structure via a single threaded bush (or other connector) centrally located on the bottom of handheld GNSS device 100.

Handheld GNSS device 100 may further include orientation sensors (not shown) that may include various types of sensors such as horizon sensors, MEMS gyroscopes, or magnetic compasses for generating orientation data for the device. The orientation data describes the orientation of handheld GNSS device 100 and camera lens 110 with respect to a ground plane. Orientation data may be recorded by itself or associated with various other data such as GNSS position data or image data. As discussed below, the orientation data may be used to mitigate error due to multipath satellite signals.

The horizon sensors may be any type of horizon sensor, such as an inclinometer, accelerometer, and the like. Such horizon sensors are well known by those of ordinary skill in the art and any such device may be used. In one example, a representation of the output of the horizon sensors may be displayed using display 112. The horizon sensor information, such as pitch and roll, can be recorded along with GNSS data. The horizon sensor information may be useful, for example, to later compensate for mis-leveling of the antenna.

Magnetic compasses are well known by those of ordinary skill in the art and any such device may be used. Magnetic compasses allow determination of the magnetic direction that handheld GNSS device 100 is facing. Magnetic compass data may be recorded with a captured image. Magnetic compass data may be useful, for example, to determine the direction of image data obtained from the front facing camera.

MEMS gyroscopes are well known by those of ordinary skill in the art and any such device may be used. The MEMS gyroscopes allow measurement of the angular velocity of handheld GNSS device 100. Based on a starting direction from, for example, a magnetic compass, the MEMS gyroscope information may be used to determine the direction that the front of the device is facing. The MEMS gyroscope information may be recorded with a captured image. The MEMS gyroscope information may be used, for example, to determine the spatial relationship between two images captured by the front-facing camera.

Handheld GNSS device 100 may further include a distance sensor (not shown) to measure a linear distance. The distance sensor may use any range-finding technology, such as sonar, laser, radar, infrared, and the like. Such distance sensors are well-known by those of ordinary skill in the art and any such device may be used.

Figure 5A:
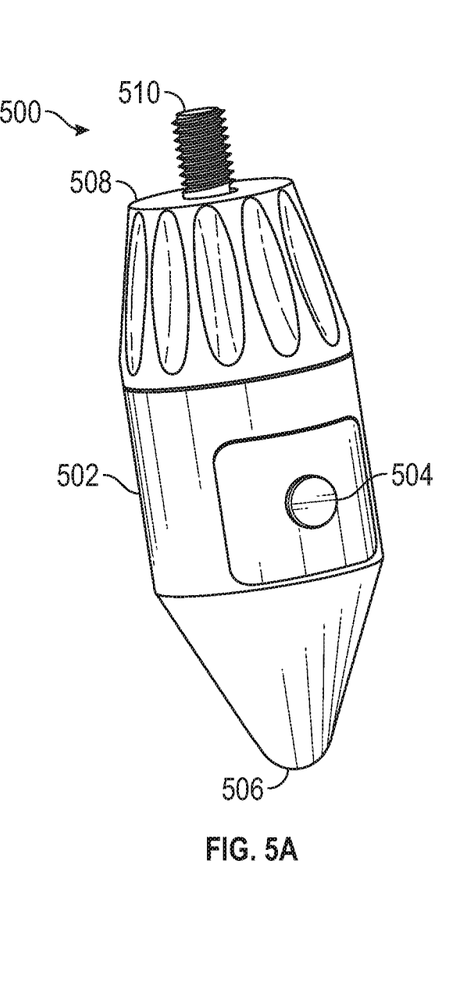
FIGS. 5A-5C illustrate different views of a magnetic locator according to embodiments of the present invention.
Figure 5B:
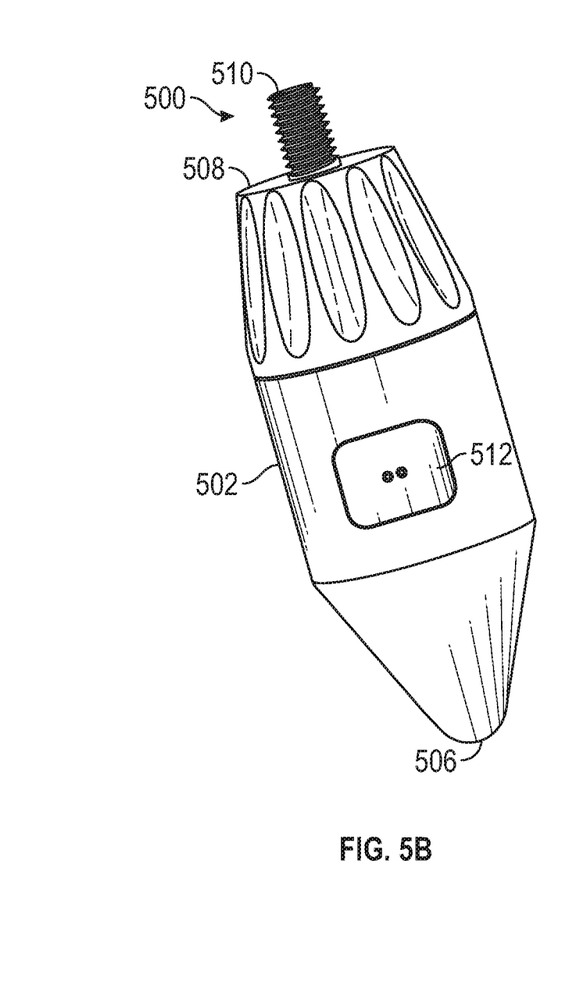
Figure 5C:
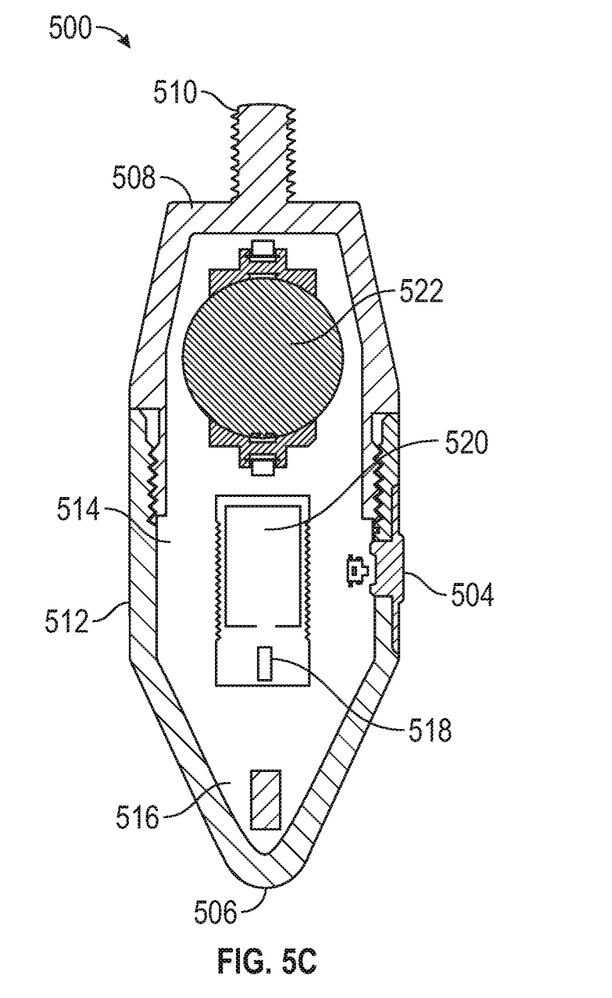

FIGS. 5A-5C depict different views of magnetic sensor 500 according to an embodiment of the present technology. Referring to FIG. 5A, magnetic sensor 500 includes a housing 502 that provides a structure for connecting the other components together. Housing 502 may be made of a durable material, such as plastic, and be about 5 inches long. Housing 502 includes power button 504. Housing 502 is elongated with end 506 on one side and end 508 on the opposite side. End 506 is pointed to enable precise placement of magnetic sensor 500. Connector 510 is positioned on end 508 and is configured to be connected to an antenna of a GNSS device.

Figure 6:
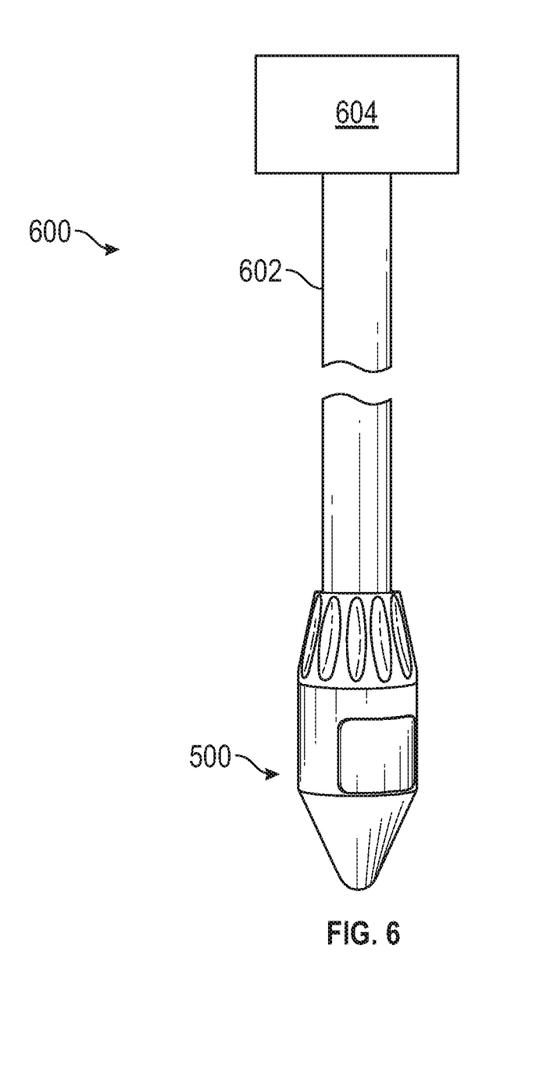
FIG. 6 depicts a GNSS system according to embodiments of the present technology.

For example, FIG. 6 depicts GNSS system 600 that includes magnetic locator 500 connected to the bottom of survey pole 602. The top of survey pole 602 is connected to GNSS component 604. In some cases, GNSS component 604 is a standalone GNSS antenna and magnetic locator 500 is connected to the GNSS antenna through survey pole 602. Additionally, in this case, GNSS antenna 604 includes an electrical interface that allows GNSS antenna 604 to connect to a GNSS device (e.g., handheld GNSS device 100 of FIGS. 1-4). In other cases, GNSS component 604 may be a GNSS device with an integrated GNSS antenna (e.g., handheld GNSS device 100 of FIGS. 1-4) and magnetic locator 500 is connected to the GNSS antenna through survey pole 602 and the GNSS device of GNSS component 604.

While FIGS. 5A-5C and 6 depict magnetic locator 500 as a small module to be connected to an end of a survey pole or other mounting structure, magnetic locator 500 could also be integrated with a survey pole or other mounting structure. In this variation, connector 508 for connecting to a GNSS antenna may be on an end of the survey pole.

Referring to FIG. 5B, magnetic locator 500 includes indicator 512 that provides information the status of magnetic locator 500. For example, indicator 512 may indicate that magnetic location 500 has power, is taking a measurement, is low on battery power, has a connection to a GNSS device, is transmitting or receiving data, or is in an error state.

Referring to FIG. 5C, magnetic locator 500 includes substrate 514 (e.g., a printed circuit board) with various components mounted on it. For example, magnetic field sensor 516, communications interface 518, processor 520, and a battery mount may be mounted on substrate 514.

Magnetic field sensor 516 detects the presence and strength of a magnetic field that is adjacent magnetic locator 500. Preferably, magnetic field sensor 516 detects the presence and strength of a magnetic field that is adjacent end 506. Magnetic field sensor 516 may include multiple sensing elements (e.g., two matching magnetic sensing elements). Magnetic field sensor 516 is electrically coupled to processor 520 so that measurement data sensed by magnetic field sensor 516 can be sent to and received by processor 520, which may then interpret the measurement data to create magnetic field data.

Processor 520 is electrically coupled to communications interface 518 so that measurement data and/or magnetic field data can be transmitted to, for example, a GNSS device (e.g., handheld GNSS device 100 of FIGS. 1-4). In some cases, communications interface 518 may also receive instructions from the GNSS device. For example, the instructions may include calibration data, requests to take measurements, or other commands. Communications interface 518 may send received instructions to processor 520 for processing.

A battery mount holds battery 522, which acts as a power source for magnetic locator 500. In other variations of magnetic locator 500, an external power source (e.g., a GNSS device) may be coupled to the magnetic locator through a cable, connections integrated with connector 510, or other electrical couplings.

Although the current embodiment of the present invention is being described with respect to a magnetic locator, other embodiments of the present invention could use other types of sensors, such as an earth sensor. The earth sensor may be similar to magnetic locator 500 of FIGS. 5A-5C, except instead of or in addition to sensing or using magnetic fields to detect metallic objects, the earth sensor may take measurements of one or more other properties of the earth. For example, the earth sensor may measure the moisture content of the earth, the density of the earth, the electrical current or current density in the earth, mineral or chemical content of the earth, or other parameters of the earth adjacent the earth sensor.

Figure 7:
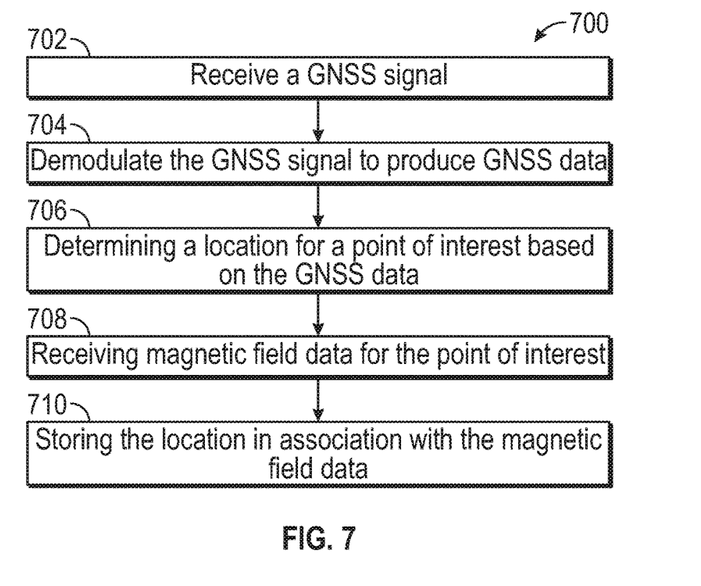
FIG. 7 depicts a process for using a GNSS system according to embodiments of the present technology.

FIG. 7 illustrates an exemplary process 700 for using a GNSS system (e.g., GNSS system 600) that includes a GNSS device (e.g., handheld GNSS device 100 of FIGS. 1-4) and a magnetic locator (e.g., magnetic locator 500 of FIGS. 5A-5C).

In block 702, a GNSS device receives a GNSS signal from a plurality of GNSS satellites through a GNSS antenna of the GNSS. For example, to determine a location of the GNSS device, the GNSS signal should contain signals from at least four GNSS satellites. After receiving the GNSS signal at the antenna, the GNSS signal may pass through a GNSS receiver that includes a radio frequency front end circuit that, for example, filters and/or amplifies the GNSS signal.

In block 704, the GNSS signal is demodulated to determine GNSS data. The GNSS data, for example, includes data (e.g., timing data) for GNSS satellites (preferably, four or more GNSS satellites). Demodulation may occur within the GNSS receiver of the GNSS device. As one alternative, the demodulation may occur within a general purpose processor (e.g., an application processor) running demodulation software.

In block 706, a processor of the GNSS device determines a location for a point-of-interest. The processor may be the same general purpose processor used in block 704 to demodulate the GNSS signal or it may be a different processor. The point-of-interest, for example, may be any point for which a user of the GNSS device wants to determine a location. For example, the point-of-interest may be a point in a specific relationship with the GNSS device (e.g., the point may be directly below the GNSS device). As another example, the point-of-interest may be a point in a field of view of a camera of the GNSS device.

In block 708, sensor data is received at the GNSS device from a magnetic locator. For example, the GNSS device may receive sensor data from a magnetic locator that is connected to the GNSS device through a survey pole (e.g., see FIG. 6). The magnetic locator may operate similar to magnetic locator 500 of FIGS. 5A-5C. The sensor data may include magnetic field data, data indicating the presence of metal, electromagnetic data, or other magnetic-related data).

In block 710, the location and corresponding magnetic field data for the point-of-interest are stored in memory of the GNSS device in a manner that associates the location and magnetic field data together. For example, the location may be tagged with the magnetic field data. As another example, the location and magnetic field data may be stored in a structured document, such as an XML documents, or a database that associates the location and magnetic field data with each other.

FIGS. 8-11 depict example user interfaces that may be displayed on a GNSS device while using process 700 or another process of the present technology.

Figure 8:
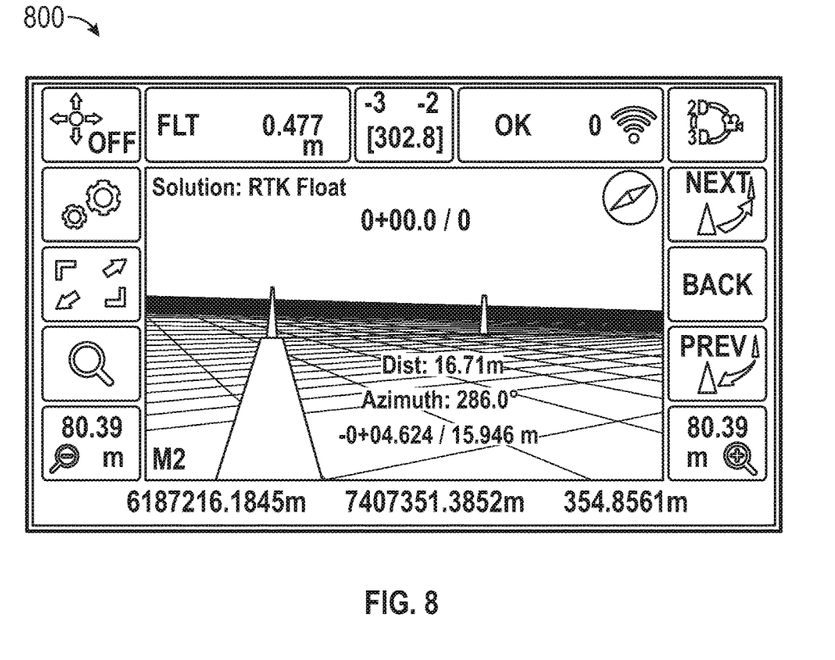
FIGS. 8-11 are example user interfaces that may be displayed on a GNSS device operating according to embodiments of the present technology.

FIG. 8 depicts user interface 800 for a stakeout that guides a user to a point-of-interest. For example, user interface 800 may be produced when using the GNSS device in a mode similar to that described in U.S. Pat. No. 9,228,835, which is hereby incorporated by reference in its entirety.

Figure 9:
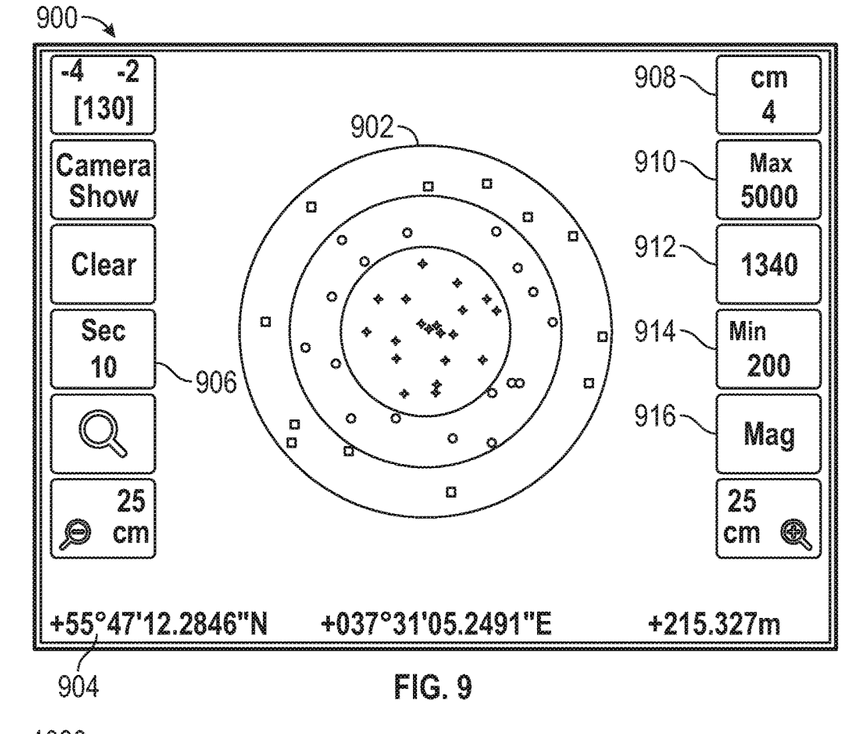

FIG. 9 depicts user interface 900 of the results of scanning around a main point-of-interest. The various measurement points (represented by open circles, filled circles, and open squares) are represented in graphical representation 902 that shows the locations of the measurements points relative to each other. Each measurement may be considered to be a point-of-interest. The different symbols representing the measurements correspond to different magnitudes of sensor data (e.g., magnetic field data). The open circles are the highest magnitude of sensor data followed by the closed circles and open squares. Instead of different symbols, the magnitudes of sensor data may be represented by the colors of the dots. Based on the sensor data, location 904 is estimated for the center of the main point-of-interest. Graphical elements 906, 908, 910, 912, 914, and 916 represent various informational boxes and affordances related to the data in graphical representation 902. Graphical elements 906, 910, 914, and 916 are interactive in that a user can select them to edit values (e.g., change scan time) or start actions (e.g., start a scan). Graphical element 906 is the scan time for producing the data in graphical representation 902. Graphical element 908 is an error indication for estimate location 904. Graphical element 910 is the maximum sensor data that will be displayed in graphical representation 902. Graphical element 912 is the sensor data for the current measurement. Graphical element 914 is the minimum sensor data that will be displayed in graphical representation 902. Graphical element 916 is the start/stop scan button.

Figure 10:
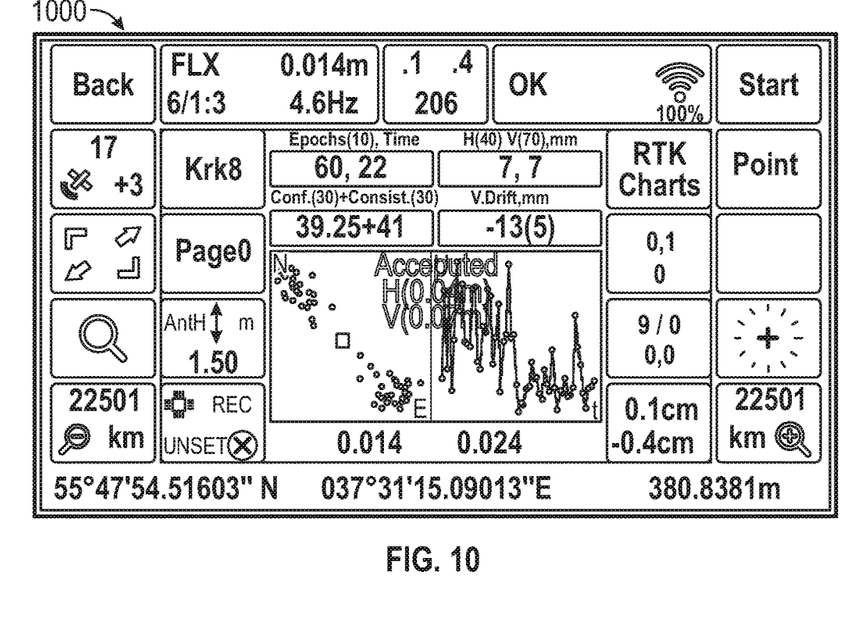

FIG. 10 depicts user interface 1000 of a collect operation for determining the location of the main point-of-interest after having determining the general location of the main point-of-interest using the magnetic locator.

Figure 11:
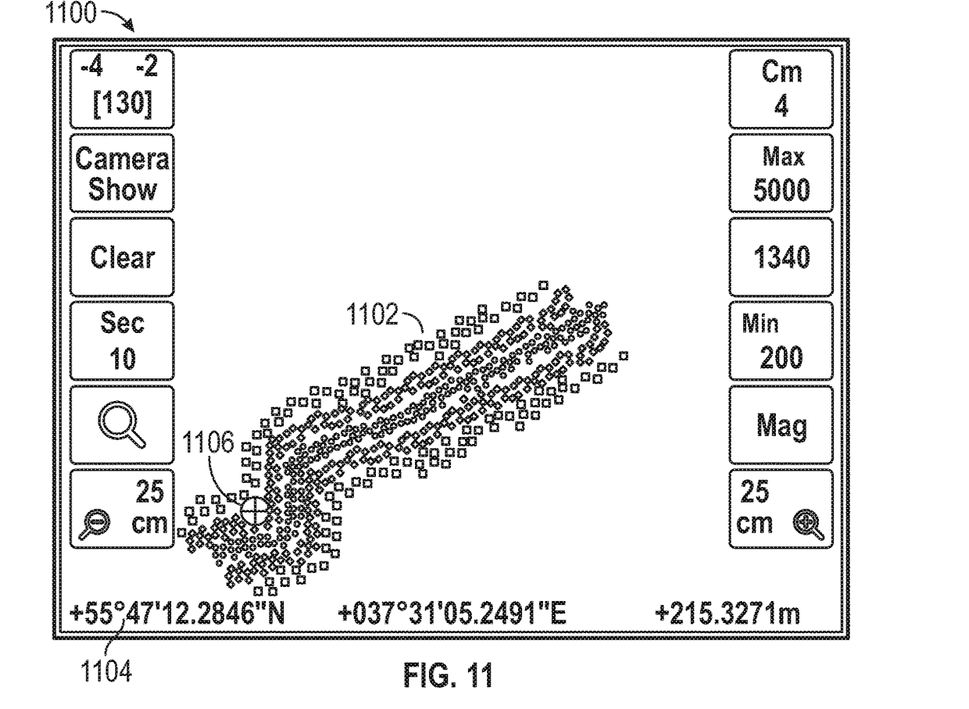

FIG. 11 depicts user interface 1100 with graphical representation 1102 of the relative positions of measurement points and magnitudes of sensor data for the points. The open circles are the highest magnitude of sensor data followed by the closed circles and open squares. Instead of different symbols, the magnitudes of sensor data may be represented by the colors of the dots. Location 1104 of main point-of-interest 1106 is also depicted. Graphical representation 1102 could depict a wire or pipe buried under the ground. Even though it may not be possible to visually see the wire or pipe, the location of the wire or pipe can be determined based on the sensor data and location determined from the GNSS system.

Figure 12:
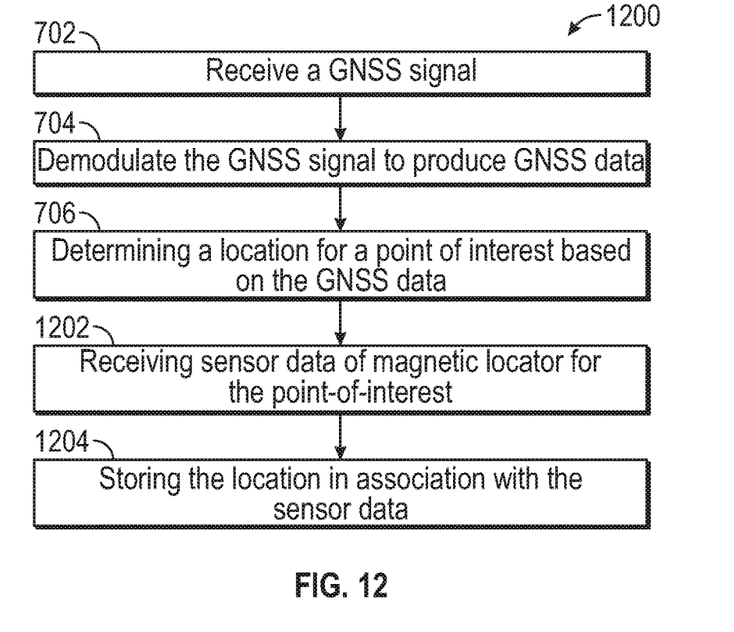
FIG. 12 depicts a process for using a GNSS system according to embodiments of the present technology.

FIG. 12 illustrates an exemplary process 1200 for using a GNSS system that includes a GNSS device (e.g., handheld GNSS device 100 of FIGS. 1-4) and an earth sensor. Process 1200 may use a similar system as system 600 of FIG. 6, except magnetic sensor 500 is replaced with an earth sensor. The earth sensor may be similar to magnetic locator 500 of FIGS. 5A-5C, except instead of or in addition to sensing or using magnetic fields to detect metallic objects, the earth sensor may take measurements of one or more other properties of the earth. For example, the earth sensor may measure the moisture content of the earth, the density of the earth, the electrical current or current density in the earth, mineral or chemical content of the earth, or other parameters of the earth adjacent the earth sensor.

Blocks 702, 704, and 706 of process 1200 operate in a similar manner as the corresponding blocks of process 700 of FIG. 700. Block 1202 operates in a similar manner as block 708 of process 700 (FIG. 7), except the sensor data is from the earth sensor. Block 1204 operates in a similar manner as block 710 of process 700 (FIG. 7) except the sensor data is not necessarily related to a magnetic field.

Figure 13:
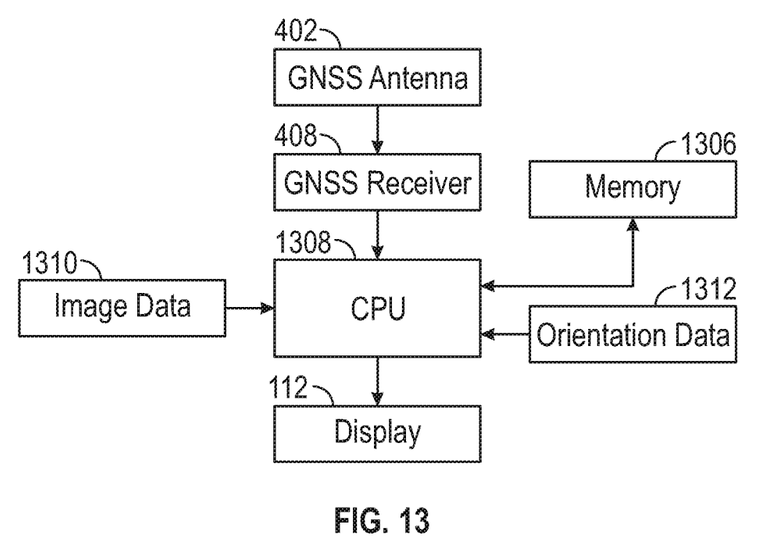
FIG. 13 illustrates a logic diagram showing the relationships between the various components of a handheld GNSS device according to embodiments of the invention.

FIG. 13 illustrates an exemplary logic diagram showing the relationships between the various components of handheld GNSS device 100. In one example, GNSS antenna 402 may send GNSS signals received from GNSS satellites to receiver 408. Receiver 408 may convert the received GNSS satellite signals into Earth-based coordinates, such as WGS84, ECEF, ENU, and the like. GNSS receiver 408 may further send the coordinates to CPU 1308 for processing along with other data. Orientation data 1312 may include pitch data from pitch horizon sensors and roll data from roll horizon sensors, for example. Image data 1310 from video or still camera may also be sent along to the CPU 1308 with the position data received by the GNSS antenna 402, positioning assistance data received by communication antenna 106, and orientation data 1312. Distance data from a distance sensor may also be used by CPU 1308. CPU 1308 processes the data to determine the position of the point-of-interest marker and provides display data to be displayed on display 112. CPU 1308 may store or retrieve data from memory 1306. For example, sensor and/or location data may be stored in memory 1306 for display or later transfer.

Figure 14:
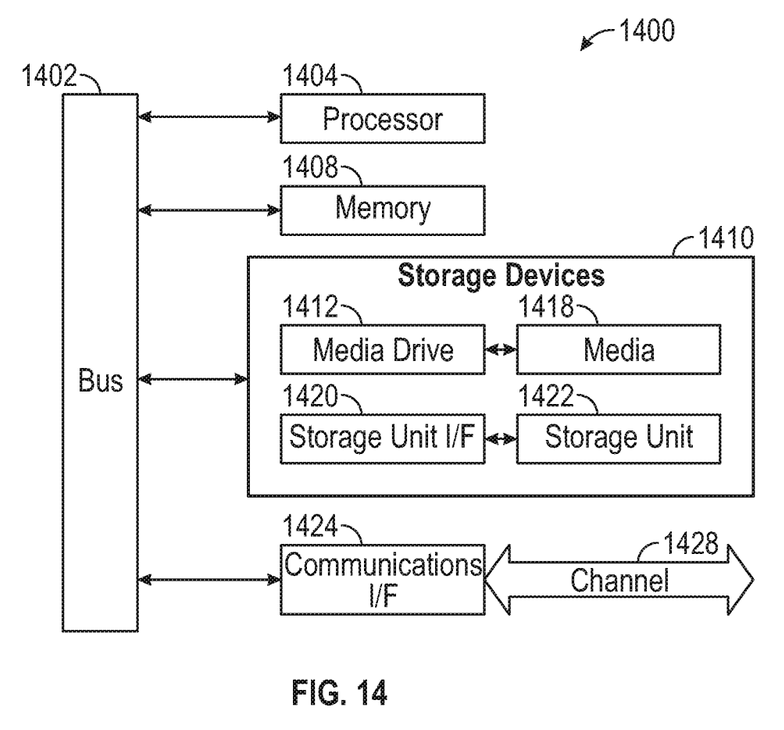

FIG. 14 illustrates an exemplary computing system 1400 that may be employed to implement processing functionality for various aspects of the current technology (e.g., as a GNSS device, receiver, CPU 1408, activity data logic/database, combinations thereof, and the like). Components of computing system 1400 may be used to implement the steps of exemplary process 700. Those skilled in the relevant art will also recognize how to implement the current technology using other computer systems or architectures. Computing system 1400 may represent, for example, a user device such as a desktop, mobile phone, geodesic device, and so on as may be desirable or appropriate for a given application or environment. Computing system 1400 can include one or more processors, such as a processor 1404. Processor 1404 can be implemented using a general or special purpose processing engine such as, for example, a microprocessor, microcontroller or other control logic. In this example, processor 1404 is connected to a bus 1402 or another communication medium.

Computing system 1400 can also include a main memory 1408, such as random access memory (RAM) or other dynamic memory, for storing information and instructions to be executed by processor 1404. Main memory 1408 also may be used for storing temporary variables or other intermediate information during execution of instructions to be executed by processor 1404. Computing system 1400 may likewise include a read-only memory (ROM) or other static storage device coupled to bus 1402 for storing static information and instructions for processor 1404.

The computing system 1400 may also include information storage mechanism 1410, which may include, for example, a media drive 1412 and a removable storage interface 1420. The media drive 1412 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 1418 may include, for example, a hard disk, floppy disk, magnetic tape, optical disk, CD or DVD, or other fixed or removable medium that is read by and written to by media drive 1412. As these examples illustrate, the storage media 1418 may include a computer-readable storage medium having stored therein particular computer software or data.

In alternative embodiments, information storage mechanism 1410 may include other similar instrumentalities for allowing computer programs or other instructions or data to be loaded into computing system 1400. Such instrumentalities may include, for example, a removable storage unit 1422 and an interface 1420, such as a program cartridge and cartridge interface, a removable memory (for example, a flash memory or other removable memory module) and memory slot, and other removable storage units 1422 and interfaces 1420 that allow software and data to be transferred from the removable storage unit 1422 to computing system 1200.

Computing system 1400 can also include a communications interface 1424. Communications interface 1424 can be used to allow software and data to be transferred between computing system 1400 and external devices. Examples of communications interface 1424 can include a modem, a network interface (such as an Ethernet or other NIC card), a communications port (such as for example, a USB port), a PCMCIA slot and card, etc. Software and data transferred via communications interface 1424. Some examples of a channel include a phone line, a cellular phone link, an RF link, a network interface, a local or wide area network, and other communications channels.

In this document, the terms "computer program product" and "computer-readable storage medium" may be used generally to refer to media such as, for example, memory 1408, storage media 1418, or removable storage unit 1422. These and other forms of computer-readable media may be involved in providing one or more sequences of one or more instructions to processor 1404 for execution. Such instructions, generally referred to as "computer program code" (which may be grouped in the form of computer programs or other groupings), when executed, enable the computing system 1400 to perform features or functions of embodiments of the current technology.

In an embodiment where the elements are implemented using software, the software may be stored in a computer-readable medium and loaded into computing system 1400 using, for example, removable storage drive 1422, media drive 1412, or communications interface 1424. The control logic (in this example, software instructions or computer program code), when executed by the processor 1404, causes the processor 1404 to perform the functions of the technology as described herein.

It will be appreciated that, for clarity purposes, the above description has described embodiments with reference to different functional units and processors. However, it will be apparent that any suitable distribution of functionality between different functional units, processors, or domains may be used. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Furthermore, although individually listed, a plurality of means, elements, or method steps may be implemented by, for example, a single unit or processor. Additionally, although individual features may be included in different claims, these may possibly be advantageously combined, and the inclusion in different claims does not imply that a combination of features is not feasible or advantageous. Also, the inclusion of a feature in one category of claims does not imply a limitation to this category, but rather the feature may be equally applicable to other claim categories, as appropriate.

Although a feature may appear to be described in connection with a particular embodiment, one skilled in the art would recognize that various features of the described embodiments may be combined. Moreover, aspects described in connection with an embodiment may stand alone.

What is claimed is:

1. A method of using a GNSS system, the GNSS system comprising:
    an elongated pole;
    a magnetic locator comprising a housing at a distal end of the elongated pole and a magnetic field sensor placed within the housing and configured to detect underground metallic objects; and
    a GNSS device at a proximal end of the elongated pole, the GNSS device comprising a display and a GNSS antenna, a processor, memory, and a communication interface connected to the magnetic locator, the method comprising, for each point-of-interest of a plurality of successive, different points-of-interest, moving the elongated pole to the point-of-interest and performing the following steps (a) to (e) for the point-of-interest:
    (a) receiving, for the point-of-interest, a corresponding GNSS signal at the GNSS device via the GNSS antenna;
    (b) demodulating the corresponding GNSS signal to produce GNSS data for the point-of-interest;
    (c) determining, on the processor, a location for the point-of-interest based on the GNSS data for the point-of-interest;
    (d) receiving, at the GNSS device, via the communication interface, magnetic sensor data for the point-of-interest from the magnetic locator and related to a presence or absence of an underground metallic object; and
    (e) storing the location for the point-of-interest in association with the magnetic sensor data in the memory,
the method further comprising displaying, at the display of the GNSS device, a map of points corresponding to the determined locations of the plurality of points-of-interest and with each point indicating the related presence or absence of an underground metallic object.

2. The method of claim 1, wherein the GNSS system further comprises a sensor configured to detect one or more of density of the earth, current density in the earth, or moisture content of the earth adjacent the sensor.

3. The method of claim 1, further comprising:
    determining an estimated size of a potential object based on the determined locations and the received magnetic sensor data for the plurality of points-of- interest.

4. The method of claim 1, further comprising:
    transmitting via the communication interface an instruction from the GNSS device to the magnetic locator, wherein the instruction triggers the magnetic field sensor to make a sensor measurement.

5. The method of claim 1, further comprising:
    determining whether the magnetic sensor data associated with a particular location among the determined locations is greater than a first threshold or lower than a second threshold; and
    in accordance with a determination that the magnetic sensor data associated with the particular location is greater than the first threshold and lower than the second threshold, displaying a graphical indicator of the magnetic sensor data and the particular location on a display of the GNSS device, or
    in accordance with a determination that the magnetic sensor data associated with the particular location is less than the first threshold or greater than the second threshold, forgoing display of a graphical indicator of the magnetic sensor data and the particular location on the display of the GNSS device.

6. The method of claim 1, wherein each point in the map indicates a magnitude of the magnetic sensor data at that location.

7. The method of claim 6, wherein differences in magnitude of the magnetic sensor data are indicated by different symbols on the map.

8. The method of claim 6, wherein differences in magnitude of the magnetic sensor data are indicated by different colors on the map.

* * * * *